United States Patent [19]

Kramer et al.

[11] Patent Number: 5,294,349
[45] Date of Patent: Mar. 15, 1994

[54] COAL DEPOLYMERIZATION AND HYDROPROCESSING

[75] Inventors: George M. Kramer, Berkeley Heights; Edwin R. Ernst, Belle Meade; Chang S. Hsu, Bridgewater, all of N.J.; Gopal H. Singhal; Peter S. Maa, both of Baton Rouge, La.

[73] Assignee: Exxon Research and Enginnering Company, Florham Park, N.J.

[21] Appl. No.: 925,356

[22] Filed: Aug. 4, 1992

[51] Int. Cl.⁵ ............... C10G 1/00; C10G 1/06; C10G 1/08
[52] U.S. Cl. ............... 208/400; 208/420; 208/421; 208/422; 208/424; 208/428; 208/435
[58] Field of Search ............ 208/400, 420, 421, 422, 208/424, 428, 435

[56] References Cited

U.S. PATENT DOCUMENTS

| | | | |
|---|---|---|---|
| 1,881,927 | 10/1932 | Pott et al. | 208/413 |
| 2,202,901 | 6/1940 | Dreyfuss | 196/22 |
| 2,347,231 | 4/1944 | Stoewener | 196/52 |
| 3,255,137 | 8/1973 | Schuman | 208/10 |
| 3,282,826 | 11/1966 | Winkler | 208/8 |
| 3,502,564 | 3/1970 | Hodgson | 208/9 |
| 3,505,203 | 4/1970 | Nelson | 208/8 |
| 3,532,617 | 10/1970 | Hodgson | 208/10 |
| 3,549,512 | 7/1968 | Hodgson | 208/10 |
| 3,677,932 | 7/1972 | Hardesty et al. | 208/108 |
| 3,748,254 | 7/1973 | Gorin | 208/8 |
| 3,764,515 | 10/1973 | Kiovsky | 208/10 |
| 3,840,456 | 10/1974 | Yavorsky et al. | 208/10 |
| 3,841,991 | 4/1975 | Cohen et al. | 208/8 |
| 3,893,943 | 7/1975 | Willard, Sr. | 252/428 |
| 3,988,238 | 10/1976 | McCollum et al. | 208/8 |
| 4,056,460 | 11/1977 | Malek | 208/8 |
| 4,090,944 | 5/1978 | Moore et al. | 208/8 |
| 4,176,051 | 11/1979 | Ternan et al. | 208/112 |
| 4,333,815 | 6/1982 | Vermeulen et al. | 208/10 |
| 4,376,695 | 3/1983 | Belinko et al. | 208/58 |
| 4,394,247 | 7/1983 | Olah | 208/10 |
| 4,426,313 | 1/1984 | Swedo | 252/353 |
| 4,518,478 | 5/1985 | Weller | 208/10 |
| 4,534,848 | 8/1985 | Sanada et al. | 208/10 |
| 4,539,095 | 9/1985 | Sunder et al. | 208/8 |
| 4,617,105 | 10/1986 | Miller | 208/8 |
| 4,675,120 | 6/1987 | Martucci | 252/8.55 |
| 4,728,418 | 3/1988 | Shabitai et al. | 208/403 |
| 5,026,475 | 6/1991 | Stuntz et al. | 208/424 |
| 5,064,527 | 11/1991 | Singhal et al. | 208/423 |

OTHER PUBLICATIONS

K. Fuji, T. Kawabata, E. Fujita, ChemPharm. Bull. (Japan), vol. 28, pp. 3662-3664 (1980).
Chemistry of Coal Utilization, 2nd Supp. vol., Ed. by M. Elliott, Chpt. 8, pp. 425-454 (1981), Wiley Interscience.
M. Node, H. Hori, E. Fujita, J. Chem. Soc. Perkin I, 1976, pp. 2237-2240.
F. Derbyshire, Chemtech, 1990, Jul., pp. 439-443.
C. Lapierre, B. Pollet, B. Monties, Holzforschung, vol. 45, pp. 61-68 (1991).
Handbook for Pulp and Paper Technologists, G. A. Smook, author, p. 6, TAPPI, Atlanta, Ga.
*Condensed Chemical Dictionary*, 9th ed., G. Hawley, ed., Van Nostrand Reinhold, N.Y., 1977, p. 806.

*Primary Examiner*—R. Bruce Breneman
*Assistant Examiner*—Patricia L. Hailey
*Attorney, Agent, or Firm*—James H. Takemoto

[57] ABSTRACT

A process for hydroprocessing coal to hydrocarbon oils wherein coal is depolymerized at low temperatures by contacting finely divided coal with a hard acid and soft base. The depolymerized coal is then hydroprocessed to hydrocarbon oils by forming a mixture with a coal conversion catalyst or precursor thereof, and hydroprocessing the mixture at temperatures of from 250° to 550° C. and hydrogen partial pressures of from 2100 to 35000 kPa.

8 Claims, 4 Drawing Sheets

COAL DEPOLYMERIZATION AND HYDROPROCESSING

BACKGROUND OF THE INVENTION

Field of the Invention

This invention relates to a process for depolymerizing coal. More particularly, coal is depolymerized under mild conditions using a hard acid/soft base treatment. The depolymerized coal is an excellent feedstock for liquefaction and can be converted in high yields to light liquid products under mild hydroprocessing conditions. The depolymerized coal can also be converted to low ash coal.

Description of Related Art

Studies on the structure of coal have established that coal has a complex polymeric structure containing ethers and short alkylene chains as typical linking groups between substituted aromatic units typically with ring numbers of 1 to 4.

There are numerous processes for the conversion of coal to liquid hydrocarbon products involving hydroprocessing coal in the presence of a catalyst system. These processes typically utilize nickel, tin, molybdenum, cobalt, iron and vanadium containing catalysts alone or in combination with other metals such as selenium at high temperature alone or in combination with high hydrogen pressure. Coal can be impregnated with catalyst or the catalyst supported on a carrier. In some processes, coal is subjected to an initial solvent extraction prior to hydroprocessing. Solvents used for extraction include tetralin, decalin, alkyl substituted polycyclic aromatics, phenols and amines. Typical solvents are strong hydrogen donors.

Coal liquefaction may also be accomplished using combinations of catalysts with various solvents. Metal halides promoted with a mineral acid, $ZnCl_2$ in the presence of polar solvents and quinones in combination with ammonium ions, group 1a or 1b metal alkoxides or hydroxides or salts of weak acids have been used as catalyst systems for coal liquefaction. Aqueous solutions containing catalysts such as alkali metal silicates, calcium or magnesium ions and surfactants form media for breaking down coal.

Coal can be depolymerized into lower molecular weight fractions by breaking the ether or alkylene bridging groups which collectively make up coal's polymeric structure. Catalysts for coal depolymerization include $BF_3$ complexed with phenol, Bronsted acids such as $H_2SO_4$, p-toluenesulfonic, trifluoromethanesulfonic and methanesulfonic acid in the presence of a phenolic solvent, $ZnCl_2$ or $FeCl_3$. This is followed by hydrotreatment. Depolymerization reactions have been reviewed by Wender et al., "Chemistry of Coal Utilization", 2nd Supplementary Volume, M. A. Elliot ed, J. Wiley & Sons, NY, 1981, pp. 425 et seq.

The high temperatures required by catalyzed coal liquefaction processes lead to refractory materials and liquified hydrocarbon oils containing significant amounts of vacuum gas oil and other higher boiling components.

SUMMARY OF THE INVENTION

The present invention provides a process for rapidly depolymerizing coal at low temperatures while minimizing the formation of refractory material by controlling the side reactions leading to refractory materials. The depolymerized coal can be hydroprocessed under mild conditions to yield lighter hydrocarbon products in high yields while minimizing the formation of vacuum gas oils and other high boiling fractions. Depolymerized coal can also be selectively extracted to remove mineral contaminants to yield a low ash coal. Additional advantages of the present coal depolymerization process will become apparent in the following description.

In accordance with the present invention, coal is depolymerized by contacting finely divided coal particles with a hard acid in the presence of a soft base at temperatures of from 0° C. to 100° C., said hard acid being characterized by a heat of reaction with dimethylsulfide of from 10 kcal/mol to 30 kcal/mol and said soft base being characterized by a heat of reaction with boron trifluoride of from 10 kcal/mol to 17 kcal/mol and extracting the depolymerized coal to remove hard acid and soft base. The depolymerized coal may be converted to a low ash coal by extracting it to remove the hard acid and soft base and a portion of the mineral contaminants followed by treating the extracted coal with a swelling solvent to remove mineral contaminants not removed by extraction. Extracted depolymerized coal can be hydroprocessed to produce light hydrocarbon oils by forming a mixture of depolymerized coal and catalyst precursor containing a dihydrocarbyl substituted dithiocarbamate of a metal selected from any one of groups IV-B, V-A, VI-A, VII-A and VIII-A (as given in the periodic table set forth in F. A. Cotton and G. W. Wilkinson, "Advanced Inorganic Chemistry", 4th ed., John Wiley and Sons, NY) or mixtures thereof, hydroprocessing the mixture at temperatures of from 250° C. to 550° C. and a hydrogen partial pressure of from 2100 kPa to 35000 kPa and recovering hydrocarbon oil.

The combined hard acid and soft base treatment rapidly cleaves and traps the components of many ether and alkyl-aromatic linkages in the coal structure which are normally susceptible to acid catalysis while controlling or minimizing retrograde reactions which could lead to more refractory materials. Depolymerization occurs rapidly at temperatures below 100° C. without added pressure. At room temperature, maximum depolymerization typically is accomplished in less than one hour. The resulting depolymerized coal can then be solvent extracted to remove the reagents, some cleaved fragments and a variable amount of the mineral matter while leaving the bulk of the depolymerized coal as a residue. With a suitable solvent this residue can be left with a very low mineral content. Hydroprocessing the depolymerized coal under mild conditions, with or without extraction, results in liquefied hydrocarbons being produced at higher rates and at higher conversion levels to more desirable light liquid hydrocarbons than are attainable from the untreated coal.

DESCRIPTION OF THE PREFERRED EMBODIMENTS

The process of the invention provides a rapid, low temperature method for depolymerizing coal by breaking the linking groups between condensed aromatic groups which give coal its polymeric character. The hard acid/soft base system of the invention preferentially traps ionic intermediates formed by the decomposition of ethers and alkylaromatics before they undergo retrograde condensation reactions with neighboring components of the coal.

Hard acids are of small size, have high positive charge, have empty orbitals in their valence shells and are characterized by low polarizability and high electronegativity. Soft bases are electron donors and are characterized by having high polarizability, low electronegativity and are easily oxidized. In general, hard acids prefer to bond to hard bases and soft acids prefer to bond to soft bases.

These general characteristics have been discussed in a series of articles written by R. G. Pearson, many of which are summarized in, "Hard and Soft Acids and Bases", Ed. R. G. Pearson, Dowden, Hutchinson & Ross, Inc. 1973. Hard acids are typified by $H^+$, $Al^{3+}$, $B^{3+}$, $U^{6+}$ where these ions may be isolated species or components of molecules or larger ions containing vacant orbitals like $AlBr_3$, $BF_3$ or $UO_2^{2+}$ etc. Typical soft bases are molecules containing S or P atoms as in ETSH or $Me_2S$ or $Me_3P$ rather than O or N atoms as in the corresponding compounds ETOH, $Me_2O$ and $Me_3N$. The latter 3 compounds are typical strong bases and are expected to form strong coordination complexes with hard acids. The strong interaction essentially neutralizes the acids. Hard acids according to the present invention are characterized by a heat of reaction (or complexation) with dimethylsulfide in the range of from 10 kcal/mol to 30 kcal/mol. Similarly, soft bases are characterized by a heat of reaction (or complexation) with boron trifluoride in the range of from 10 kcal/mol to 17 kcal/mol. As noted by W. B. Jensen, "The Lewis Acid-Base Concepts", J. Wiley & Sons, 1980, p. 253, the hard soft acid base ("HSAB") concept is qualitative in nature. As discussed in Jensen's book, heats of reaction (or complexation) provide one method of delineating hard soft acids bases. Preferred hard acids are methanesulfonic acid, toluenesulfonic acid, benzenesulfonic acid, trifluoromethanesulfonic acid, fluoroboric acid, $H_2O:BF_3$ mixtures and preferred soft bases are ethylmercaptan, methylmercaptan and dimethylsulfide.

By contrast, in mixtures of strong acids and weak bases the components are relatively free and hence able to act relatively independently. Thus hard acidic reagents like protons can attack many ethers and initiate bond cleavage reactions leading to carbocation formation while a sulfur compound like ETSH or $Me_2S$ (both of which are known to be very good nucleophiles) will react with these ions more rapidly than an oxygenated base like water. Trapping a carbocation by EtSH forms a protonated sulfide or sulfonium ion which upon loss of a proton leaves a sulfide as a final product. Trapping with $Me_2S$ on the other hand forms a much more stable tertiary sulfonium ion which will tend to remain in the final product as a salt.

Both mercaptans and sulfides like $Me_2S$ are efficient trapping agents. To a large extent, the sulfonium ions produced by ETSH function as reaction intermediates and the bulk of the reagent is easily regenerated. Using $Me_2S$ as a trapping agent does seem to produce a large amount of relatively stable sulfonium salts. To a large extent these can be decomposed by treatment with a solvent like MEOH. Most of the $Me_2S$ can be recovered, however, some of the salts may lead to the formation of stable sulfides through unknown side reactions thereby rendering some $Me_2S$ difficult to recover.

While not wishing to be bound by any particular theory, it is believed that the hard acid/soft base catalyst system ("HSAB") of the invention functions by altering the cleavage of the coal ether linkages to minimize side reactions. Depolymerization reactions using hard acid/hard base systems ("HAHB"), e.g., $BF_3$/phenol or Bronsted acid/phenol result in coal depolymerization by attacking the same ether and alkyl binding groups in the coal matrix as the HSAB system but phenol, being an oxygenated base, is not nearly as efficient a nucleophile as a thiol like ETSH and hence does not trap developing carbocations as rapidly. Instead of forming lower molecular weight fragments it is theorized that HAHB systems leave the ion free to add to another part of the coal matrix in a competitive or retrograde trapping reaction. The result is that the coal has been rearranged to a structure which in most cases will be at least as stable as the unreacted coal as a relatively reactive link in the coal has been transformed into a much more stable entity.

The catalyst system of the invention may be applied to the depolymerization of coal and other similar naturally occurring hydrocarbons. Rawhide and Wyodak coals are subbituminous coals with an overall composition containing about 20 or more percent organically bound oxygen, and other subbituminous coals of similar overall composition should behave in a similar manner. Since higher rank coals which contain alkylaromatic bonds as well as ether linkages are amenable to acid catalyzed cleavage reactions, it is believed that similar benefits will be found throughout the range of available coals. While particle size is not critical to the invention, it is preferred to use finely divided coal to increase surface area and therefore efficiency of reaction. Preferred coal particle sizes are from 10 to 1000$\mu$, especially 10 to 250$\mu$.

No added solvent is required as the hard acid/soft base catalyst system itself can function as the solvent. If desired, an added solvent or co-solvent can be employed. The major role of the solvent in the HSAB system is to facilitate the access of the acidic and basic reagents to sites within the coal structure so that the nucleophile is present when the instant cleavage occurs. It is known that coals swell as they absorb solvents which interfere with hydrogen bonding interactions endemic to the material. Thus a solvent which interacts with a phenolic proton which would otherwise be bonding to another site in the matrix would be expected to swell the coal and aid the desired access of the HSAB components, provided that the added solvent itself is not so basic as to neutralize the acidic catalyst. Methanol appears to function in this manner as it has been found that it can be mixed with ETSH while using $BF_3$ catalysts to provide enhanced depolymerization.

Alternatively one may add a nonreactive, nonswelling but freely flowing co-solvent like n-hexane to ETSH to facilitate formation of a slurry. Such a co-solvent has been used to facilitate the separation and detection by gas chromatography of decomposition fragments resulting from the HSAB reaction of the coal. In the reaction of Wyodak coal with $BF_3:H_2O$ in 50:50 $EtSH:nC_6H_{14}$ the hexane layer has been found to contain 2,2-dithioethylpropane, $CH_3-C(C_2H_5S)_2-CH_3$, as a major product of the coal cleavage reaction. Co-solvents like hexane may also be used to wash unreacted mercaptans and sulfides from the depolymerized coal even though they have little tendency to swell the coal.

Unlike other catalyst systems for depolymerizing coal, the hard acid/soft base catalyst of the invention depolymerizes coal rapidly under very mild conditions. Pressures are autogenous and temperatures range from 0° to 100° C. The preferred temperature range is 15° to 75° C. Even at room temperature, depolymerization typically is complete in less than one hour. In order to optimize depolymerization and minimize retrograde reactions whereby coal fragments recombine to produce refractory materials, the extent of depolymerization, as characterized by the amount of extractables formed, is determined as a function of time. The amount of extractables can be measured by extraction of treated coal with a polar solvent or mixtures thereof such as methanol, tetrahydrofuran, dimethylformamide and the like.

Figure 1:
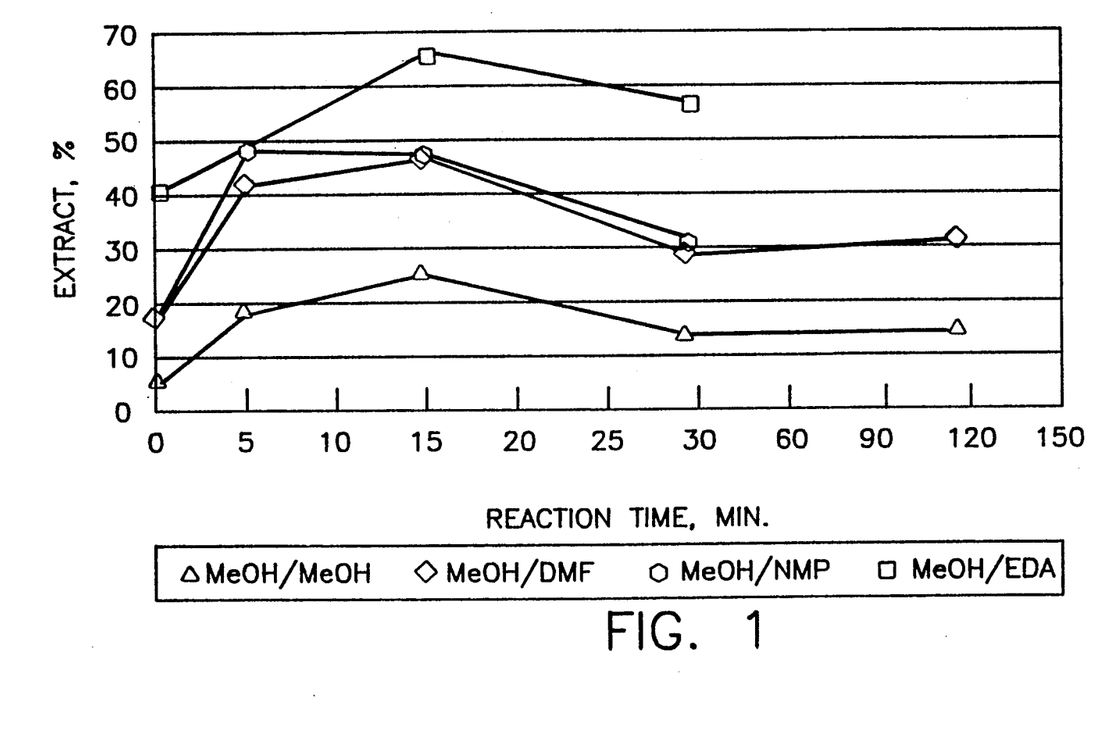
FIG. 1 illustrates the rapid depolymerization of Rawhide coal treated with methanesulfonic acid and ethylmercaptan.

FIG. 1 is illustrative of the rapid depolymerization possible using a hard acid/soft base catalyst. When Rawhide coal is contacted with methanesulfonic acid and ethyl mercaptan in the presence of n-hexane at room temperature, depolymerization peaks rapidly. For various solvent extraction systems containing methanol (MeOH), dimethylformamide (DMF), n-methylpyrrolidone (NMP) and ethylenediamine (EDA), extractables expressed as percent extract reach a maximum at about 15 minutes. While not desiring to be bound by any reaction mechanism, it is believed that methanesulfonic acid reacts with the ether linkage in the coal to form a protonated species (an oxonium ion). The latter undergoes cleavage to yield a carbocationic fragment stabilized by reaction with the soft base, ethyl mercaptan, thus forming a sulfonium ion and a phenolic or hydroxy alkyl fragment. The sulfonium ion may react rapidly with the $CH_3SO_3^-$ anion to yield sulfonate esters. When the product is subsequently washed with methanol, this mixture of sulfonate esters undergoes methanolysis wherein the acid is removed from the coal leaving behind coal fragments stabilized by internal hydrogen bonding.

Figure 2:
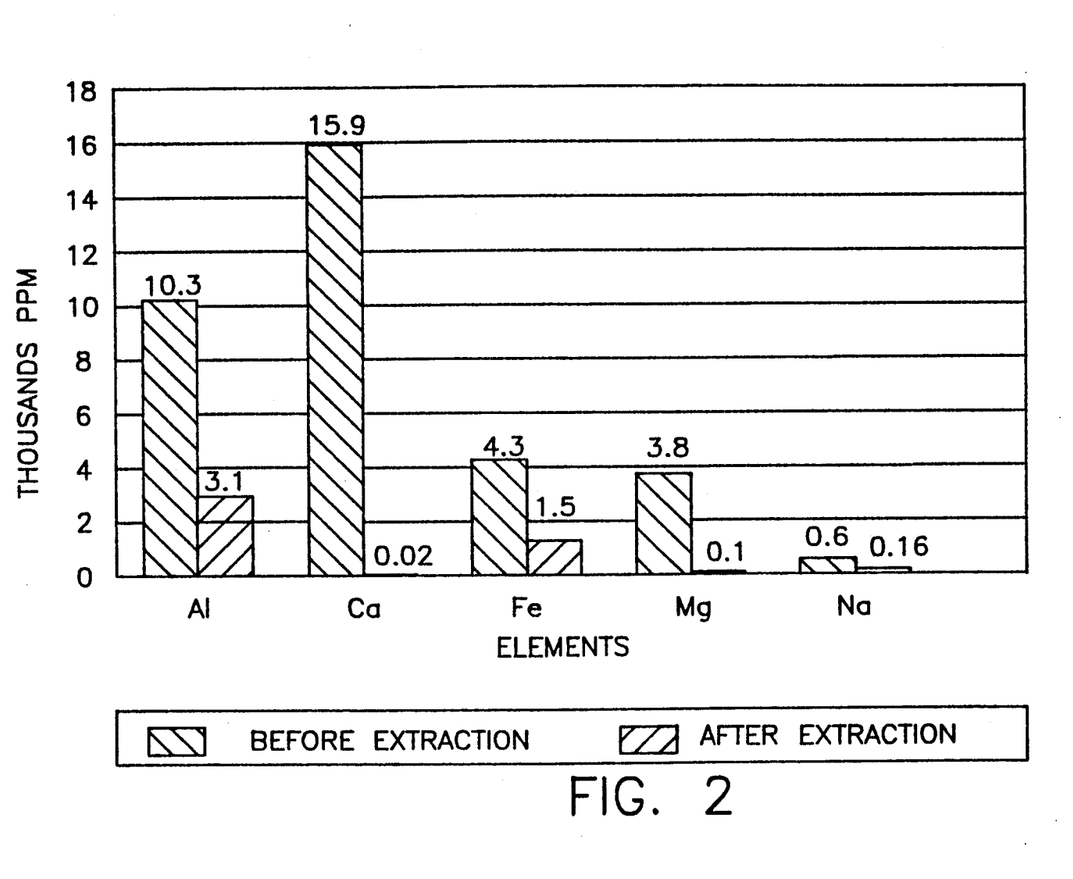
FIG. 2 illustrates the removal of mineral matter from Rawhide coal by extraction after treatment with methanesulfonic acid and ethylmercaptan.

By controlling the nature of the extraction solvent, it is possible to remove mineral contaminants from coal. As shown in FIG. 2, when depolymerized coal is extracted with methanol, most of the alkali and alkaline earth metals are removed along with substantial amounts of heavier metals. In the untreated coal, aluminum, calcium, iron, magnesium and sodium mineral matter are found at concentrations of 10,300, 15,900, 4,300, 3,800 and 600 ppm, respectively. After treatment with methanesulfonic acid/ethyl mercaptan and methanol extraction, these concentration are reduced to 3,100, 200, 1500, 100 and 160 ppm, respectively. The majority of the remaining mineral matter is silica which is not an environmentally hazardous substance. If desired the coal can be further treated to remove the silica. A convenient procedure is to swell the coal with a solvent whose density ($\rho$) is heavier than the organic components of coal, $\rho$ ($>$ca. 1.2 to 1.3), but lighter than $SiO_2$, $\rho$ (2.2 to 2.6). With this solvent the coal will float while silica will sink. Chlorinated or brominated solvents like methylene chloride, chloroform, carbon tetrachloride or bromoform are examples of suitable solvents.

Figure 3:
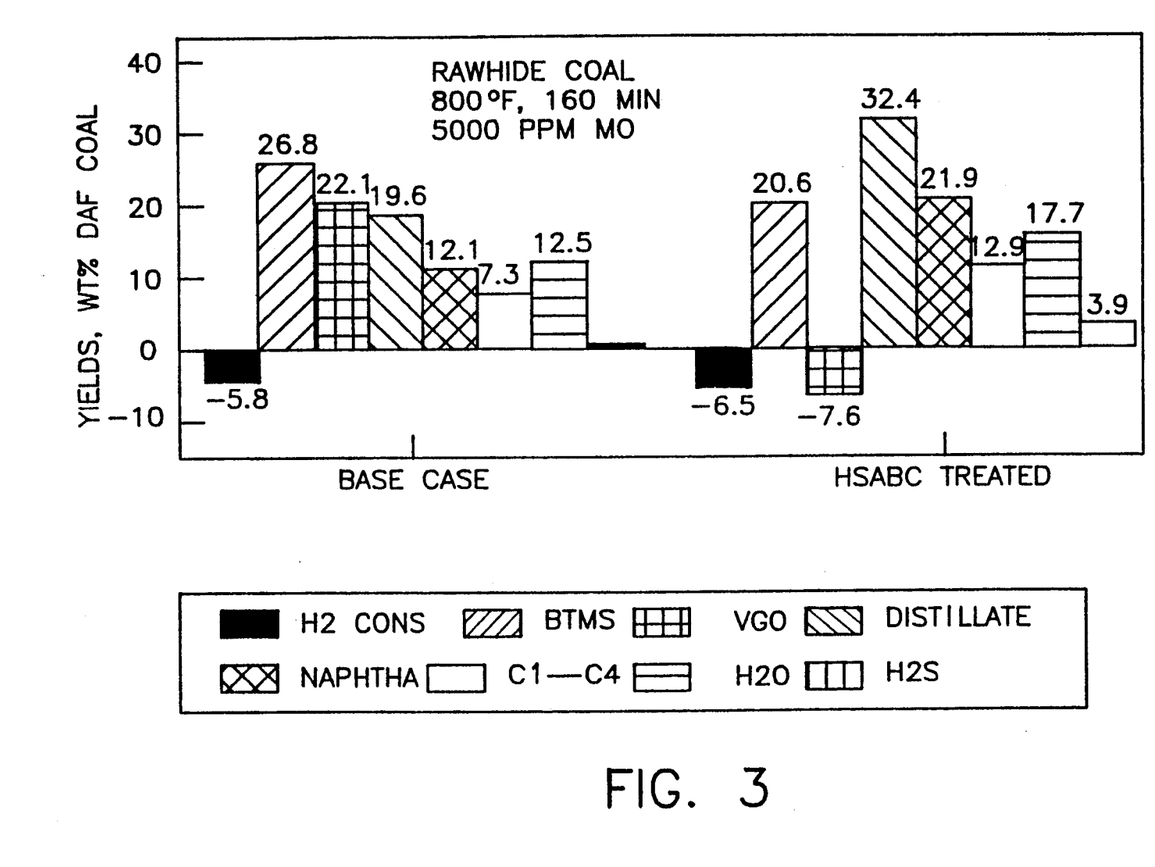
FIG. 3 is a comparison of the treated and untreated Rawhide coal upon hydroprocessing.

The depolymerized coal may also be hydroprocessed under mild conditions to produce hydrocarbon oils in which the yields of more desirable light oils such as naphtha and distillate are increased at the expense of heavier products such as vacuum gas oil. This is illustrated in FIG. 3 which compares a sample of treated and untreated Rawhide coal hydroprocessed under the same conditions, i.e., with a hydrogenation catalyst at 427° C. (800° F.), at an initial pressure of 7000 kPa, and in the presence of a solvent, i.e., a coal derived vacuum gas oil. The depolymerized coal treated with the hard acid/ soft base catalyst system yields a product slate wherein naphtha and distillate are increased by about 75% as compared to untreated coal. With respect to vacuum gas oil, untreated coal produces about 22 wt. % of this cut whereas treated coal according to the invention yields a net loss of vacuum gas oil solvent due to its conversion to lighter products.

Hydroprocessing the depolymerized coal to liquid hydrocarbons can be done under relatively mild conditions. Hydroprocessing catalysts are preferably sulfided metal compounds. Preferred metals include vanadium, niobium, tantalum, chromium, molybdenum, tungsten, manganese, rhenium, iron, cobalt, nickel, platinum, iridium, palladium, osmium, ruthenium and rhodium. Preparation of metal catalysts from dihydrocarbyl substituted dithiocarbamate metal precursors are described in U.S. Pat. No. 5,064,527 which is incorporated herein by reference.

Solvents used for hydroprocessing are preferably hydrocarbon oils derived from coal processing such as vacuum gas oil or distillates boiling in the 175° C. to 550° C. range. Other suitable solvents include intermediate product streams from petroleum processing, and substituted and unsubstituted aromatic heterocycles.

Hydroprocessing takes place at temperatures of from 250° C. to 550° C., preferably 300° C. to 450° C. Hydrogen partial pressures are from 2000 kPa to 35000 kPa, preferably 3500 kPa to 10000 kPa.

The following examples illustrate certain preferred embodiments of the process of the invention and are not intended to limit the scope of the disclosure in any manner.

EXAMPLE 1

Wyodak coal was dried under vacuum at 65° C. 20 g of dried coal is slurried with 2.2 ml water, 20 ml of ethyl mercaptan and 20 ml of n-hexane. The slurry is added to a magnetically stirred 300 ml Hastelloy-C Autoclave. The autoclave is charged with 8 g of boron trifluoride and the reaction allowed to proceed with stirring at room temperature for varying times up to 19 hrs. Products were washed with water and dried under vacuum at 100° C. The solids are extracted with either pyridine or tetrahydrofuran using a soxhlet extractor.

Figure 4:
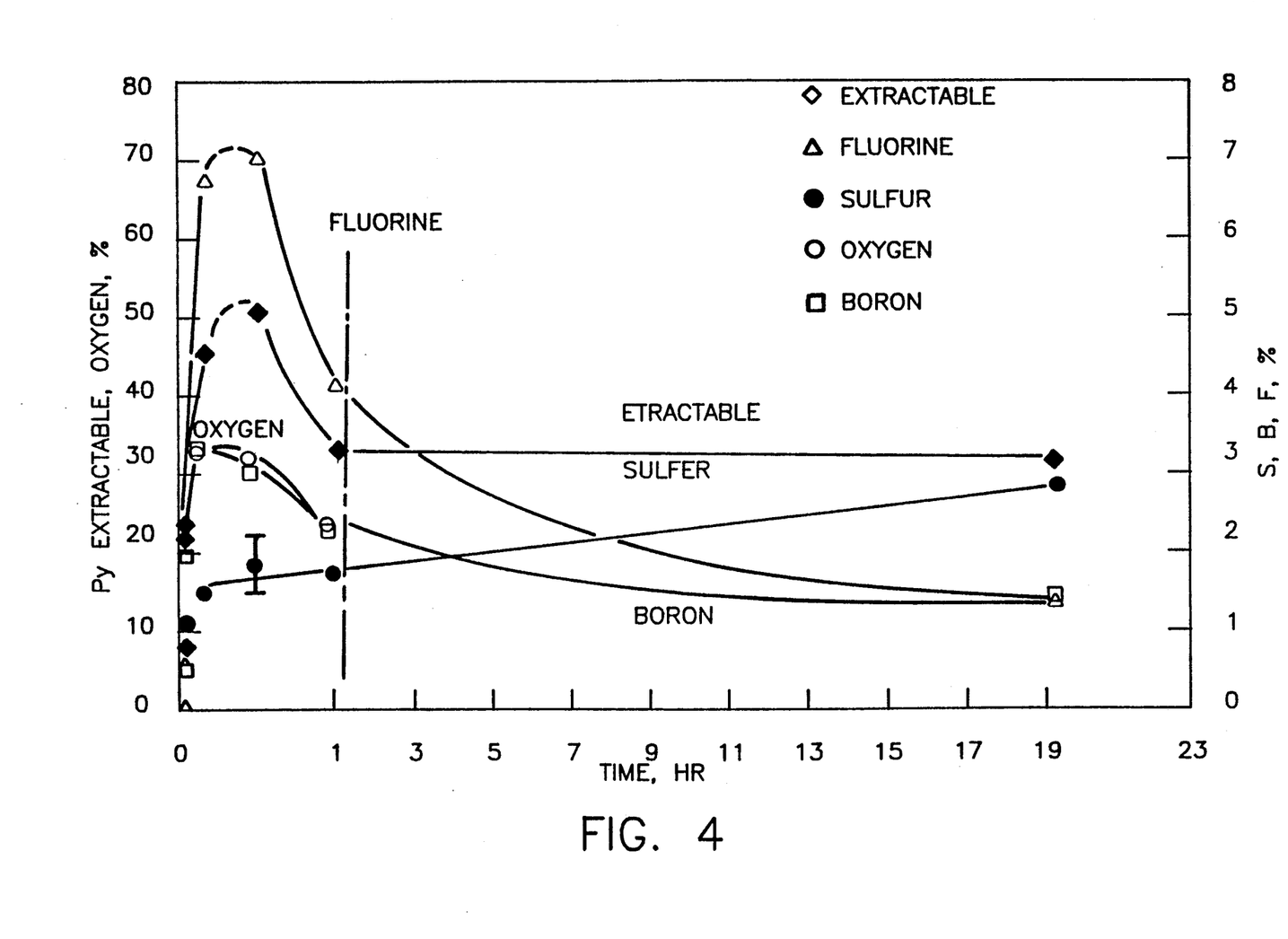
FIG. 4 illustrates the pyridine extractables and elemental composition of depolymerized Wyodak coal after treatment with $BF_3:H_2O$ and ethylmercaptan.

FIG. 4 shows the pyridine extractables and the elemental composition of products of the reaction of Wyodak coal as a function of reaction time expressed on a dry coal basis. Repetitive experiments done at 2 and 30 minutes showed the amount of extractables to be reproducible to about ±1 percent. Note that the time scale to the left of the vertical broken line is somewhat expanded.

The extractables are maximized after a short reaction period at ambient temperature after which they decrease. This is direct evidence for the existence of a series of consecutive reactions during the acid catalyzed depolymerization of Wyodak coal. About 50% of the coal becomes extractable by pyridine after a short time but these initially soluble products undergo further reaction which transforms them into less pyridine soluble material while they are still in the autoclave.

Table 1 lists the elemental composition of Wyodak coal and of the 30 minute product obtained in duplicate experiments.

TABLE 1

| Exp't Relative Wt., g | Wyodak 100 | Rxn I 129[b] | Product[a] II 129[b] | Notes[c] |
|---|---|---|---|---|
| Wt % (Dry Basis) | | | | |
| C | 64.8 | 50.4 | 51.6 | |
| H | 5.0 | 4.7 | 5.3 | |
| O | 24.7 | (32.6) | 32.2 | |
| N | 0.6 | 0.7 | 0.7 | |
| S | 1.0 | 1.5 | 2.2 | |
| B | 0.0 | 3.1 | | |
| F | 0.0 | 7.0 | | |
| Other Inorg. Elem. | 3.5 | | | |
| Elemental Bal. | 99.6 | (100.0) | (92.0) | |
| Atom Ratio | | | | |
| H/C | 0.93 | 1.12 | 1.23 | |
| O/C | 0.3 | | 0.5 | Water added |
| F/B | | 1.3 | | "B" has lost 1-2 "F's" |
| B/C | 0 | 0.07 | | Adding ca. 1 "B"/2 Rings |
| B/(6-C's) | | 0.4 | | |
| B/S | | 8.9 | | Added more "B" than "S" |
| S/C | 0.006 | 0.011 | 0.016 | [0.5-1] "S"/100 C added |

[a]Dried reaction product before extraction.
[b]See Table 2.
[c]Deduced from comparisons of the product and reactant. It is assumed that all the carbon in the reactant is still present in the products.
Additional notes
*About 2.6 Oxygens were added per Boron.
*Pyridine extracts contain >90% of the B and F with F/B = 1.4.

Run I contains a bracketed quantity indicating the amount of oxygen and inorganic components needed to make the elemental balance 100 percent. The estimated 32.6 percent is clearly consistent with the amount of oxygen found by neutron activation in duplicate run II. The data indicate that the products contain a smaller fraction of carbon than Wyodak, mainly because of the acquisition of B, F, O, and S.

The lower part of Table I presents the atom ratios of Wyodak and the reaction products. The changes indicate that the coal acquired about 0.4 borons for every 6 carbon atoms. These borons are not part of $BF_3$ adducts, as the metal has on average lost nearly 2 fluorines which have been replaced by oxygen or hydroxyl groups. As slightly more than 2 oxygens have been added per boron, it is reasonable to infer that fluoroborate esters and alcohols or hydrates must have also been formed.

It is interesting that boron appears as an end product of the trapping reactions rather than sulfides. The acquisition of boron and the formation of fluoroborates is however very dependent on the presence of ethyl mercaptan, as control experiments, with it alone excluded from the reacting system, provide only about 1/10th as many fluoroborates.

Formation of fluoroborates increases the weight of the coal, i.e., the solid products weigh more than the initial coal. It is this swollen coal which is 50 percent extractable by pyridine. A simple calculation based upon normalizing the product analysis to a constant amount of carbon indicates that the mass of coal grows by about 29 percent after the 30 min reaction, Table 2.

TABLE 2

| | | Water Washed/Dried Product | |
|---|---|---|---|
| Element. wt % | Wyodak | Rxn Product I | Adj. to Const. Carbon |
| C | 64.8 | 50.4 | 64.8 |
| H | 5.0 | 4.7 | 6.09 |
| O | 24.7 | (32.6) | (42.25) |
| N | 0.6 | 0.7 | 0.91 |
| S | 1.0 | 1.5 | 1.94 |
| B | 0.0 | 3.1 | 4.02 |
| F | 0.0 | 7.0 | 9.07 |
| Inorg. Elem. | 3.5 | ( ) | ( ) |
| | 99.6 | 100 | 129.08 |

By using the boron content of the swollen coal to estimate the amounts of fluoroborates in the 50 percent portion which is pyridine extractable, [and the results of $11_{B\text{-}NMR}$ spectra], one can conclude that 31.4 percent of the coal which contains fluoroborates are compounds that originally were in Wyodak. This is 40.8 percent of that coal.

There are several curious aspects of the fluoroborates. First is that the compounds survive extensive washing with cold water. They do lose fluorine and boron under prolonged hydrolysis; i.e., while being Soxhlet extracted with water in a process which removes about ⅔ of the inorganic elements. Their stability is somewhat unexpected as borate esters tend to hydrolyze easily. As a result these fluoroborates may be viewed as recoverable reaction products as well as intermediates in the depolymerization process.

Another intriguing property is their tendency to be present nearly exclusively in the fraction of products which is extracted by pyridine. A priori there seems to be no simple reason that the occurrence of a bond cleavage reaction does not result in fluoroborate forming in the high molecular weight as well as the low molecular component of the reaction. If this happened one might expect a fairly uniform distribution of the fluoroborates to be found in each component but the analyses indicate that about 95 percent of the "fluoroborates" are extracted by pyridine.

EXAMPLE 2

Untreated Wyodak coal and the 30 minute reaction product of Example 1 were hydroprocessed as follows. A bomb was charged with 3.0 g of coal, 6.0 g of tetralin, 7000 kPa of hydrogen and 1000 ppm of a molybdenum catalyst. The bomb was heated to 400° C. for a period of 2 hrs. After cooling, the bomb contents were examined for conversion to cyclohexane solubles.

Table 3 lists the conversion to cyclohexane solubles and gas of duplicate samples. The results are based on changes in the ash content of the reactants and products. The conversions, expressed on a dry ash-free ("DAF") basis, are very similar to those deduced independently from the amount of residue left behind after washing the bomb with cyclohexane [which removed nearly all the solubles]and then pyridine.

TABLE 3

| Sample | Conv. to Cyclohexane Solubles + Gas (DAF basis) |
|---|---|
| Untreated Wyodak | 39.96, 41.51 |
| Wyodak/$BF_3 \cdot H_2O$/EtSH | 61.10, 60.29 |
| Wyodak/$BF_3 \cdot H_2$/EtSH/Moly | 72.27, 70.47 |

The amount of gas was about the same in all experiments. Selectivity to gas corresponded to about 10 percent of the conversion after treatment with 1000 ppm of a Moly catalyst. The conversion of Wyodak increased from about 40 to 60 percent without using molybdenum and went to 70 percent when this was added to the depolymerized system.

Since the cyclohexane solutions were found to be essentially free of F and B we can estimate the conversion of the organic constituents of Wyodak [C, H and O] to organic compounds soluble in cyclohexane+gas as is summarized in Table 4.

To do this we recall that the depolymerized coal weighed 29 percent more than the starting coal as a result of the formation of fluoroborates and the hydroconversions represent 60 to 70 percent of this material. A seventy percent conversion of the fluoroborate laden coal represents about a 90 percent conversion of an initial charge of Wyodak.

TABLE 4

| | Wyodak | Depolymerized | H-treat with 1000 ppm Moly cyclohexane sol. + gas |
|---|---|---|---|
| Sample, g | 100 | 129 | |
| Organic Content, g | 96.5 | 96.5 | 90.3 |

The conversion products are about 10 percent gas and 90 percent heavy organic compounds extractable in cyclohexane. The latter solutions have been shown to be free of fluorine and boron, the respective detection limits in the analyses being 5 and 4 ppm.

EXAMPLE 3

Rawhide coal was dried as described in Example 1. 20 g of dried Rawhide coal, 20 ml hexane, 20 ml ethylmercaptan and 11 g of methanesulfonic acid was added to the stirred autoclave of Example 1 and the reaction run at room temperature and autogenous pressure for various periods of time up to 2 hrs. At the end of the desired time period, 60 ml of methanol was added and the product extracted overnight with methanol in a soxhlet extractor. The dried product was extracted a second time with a second polar solvent. For the methanesulfonic acid/ethylmercaptan catalyst system, about 15 minutes is the optimum time (see FIG. 1) and the maximum amount of extractables was obtained from the methanol/ethylenediamine solvent system. At longer times, the amount of extractables decreases indicating secondary reactions leading to refractory products.

EXAMPLE 4

Using the procedure of Example 3, Rawhide coal was treated for 30 minutes and then extracted with methanol. Analyses of untreated Rawhide coal, residue after methanol extraction and the methanol extract are summarized in Table 5.

TABLE 5

| | Rawhide | | | Residue 86.1% | Extract 13.9% |
|---|---|---|---|---|---|
| Exp't | 1 | 2 | 3 | 4 | 5 |
| C | 64.45 | 65.87 | 65.28 | 67.05 | 39.32 |
| H | 4.92 | 4.50 | 4.47 | 4.68 | 4.35 |
| N | 1.02 | 0.94 | 0.91 | 0.93 | 1.01 |
| S | 0.891 | 0.51 | 0.56 | 3.91 | 5.50 |
| O | 25.30 | 25.30 | 24.80 | 24.50 | 30.99 |
| Mat Bal | 96.52 | 97.12 | 96.01 | 101.07 | 81.17 |
| Ash$^{(a)}$ | 7.22 | 6.94 | 7.17 | 3.44 | 37.67 |
| Metals$^{(b)}$, ppm | | | | | |
| Al | | 10100 | | 3100 | |
| Ca | | 11700 | | 171 | |
| Fe | | 3690 | | 1520 | |
| Mg | | 2210 | | 83 | |
| Na | | 1650 | | 160 | |
| Si | | 10400(est) | | 10400$^{(c)}$ | 200$^{(c)}$ |

$^{(a)}$The ash is composed of ca. 50% oxygen and 50% metals.
$^{(b)}$Inductively Coupled Plasma analyses of different samples.
$^{(c)}$Silicon analyses by the Galbraith Laboratories, Inc.

The extraction process results in 13.9% of dried extract and 86.1% of residue. The extract contains most of the calcium.

EXAMPLE 5

Table 5 above establishes that almost al the silicon (in the form of silica) is left in residue after extraction. Silica is not a listed hazardous substance under 40 CFR 302 (7-1-91) edition). However, if a very low ash coal is desired, substantially all the silica can be removed. Such coal residues are environmentally advantageous as fuels since they have a low ash content and the ash generated has a low metal's content. To demonstrate this effect a small amount of methanol was added to a chloroform slurry of depolymerized Rawhide coal after it had been washed with methanol. The mixture was vigorously mixed and then centrifuged to yield floating coal and a small amount of a dark precipitate. Both samples were analyzed by EDS, energy dispersive X-ray spectrocopy. The Si/S ratio of each sample was obtained, (sulfur is an internal standard assumed to be present at a constant value in the coal fragment present in each layer). The atomic ratio of Si/S at the top was 0.10/1 and in the precipitate 0.56/1. Thus the data shows that a major separation with $SiO_2$ being concentrated in the precipitate has taken place.

EXAMPLE 6

The residue from Example 4 was Soxhlet extracted with a series of solvents to determine if bond breaking and trapping were the predominant reactions which had been catalyzed as well as to identify preferred extractants. The solvents included triethylamine, tetrahydrofuran, N,N,-dimethylformamide, dimethylsulfoxide, pyridine, N-methylpyrrolidone, hexamethylphosphoramide and ethylenediamine. The results are shown in Table 6.

TABLE 6

| Solvent | Extract, %[a] | U02 Affin.[b] Kcal/mol |
|---|---|---|
| Triethylamine | 12.5 | −8.7 |
| MeOH | 12.5 | 0.5 |
| Acetonitrile | 12.5 | 3.5 |
| Methylene chloride | 12.5 | 10 est. |
| Tetrahydrofuran | 20.5 | 0.0 |
| N,N-Dimethylformamide | 28.5 | −2.9 |
| Dimethylsulfoxide | 29.5 | −2.2 est. |
| Pyridien | 30.5 | −1.2 |
| Quinoline | 40.0 | |
| N-methylpyrrolidone | 41.5 | −3 |
| Hexamethylphosphoramide | 48.6 | −3 |
| Ethylenediamine | 60.0 | −12.8 |

[a]The sum of the extracts with methanol + the second solvent.
[b]The uranyl affinity refers to equilibration of the bases with a THF complex of uranylhexafluoroacetylacetonate in chloroform.

It was found that except for triethylamine there was a plausible connection between the basicity of these solvents and their ability to extract bitumen from the depolymerized coal. The basicities have been reported as uranyl affinities (Kramer, G. M., Maas, Jr. E. T., Dines, M. B., Inorg. Chem. 1981, 20, 1418). Thus one finds that as the basicity rises from that of methanol to ethylenediamine, the extractables increase from 14 to 61 percent. The failure of triethylamine to extract bitumen is hypothesized as due to its difficulty in diffusing into the coal rather than to its inability to access acidic sites [protons] once in the matrix.

The acidity/extractability relationship implies that the depolymerized products are held together by strong hydrogen bonding and that the interruption of this interaction renders the bitumen extractable. The major factor involved is quite reasonably the basicity of the extracting solvent.

EXAMPLE 7

A molybdenum catalyst precursor, cis-dioxobis(N,N-dibutyldithiocarbamato)molybdenum (VI), was prepared as described in U.S. Pat. No. 5,064,527. Depolymerized Rawhide coal as prepared in Example 3 was ground to fine particle size. A stirred autoclave was charged with Rawhide coal (3.5μ particle size) and vacuum gas oil (VGO) in 35.0 g coal/56.0 g VGO ratio together with 5000 ppm molybdenum catalyst as prepared above. The autoclave was sealed, pressurized with hydrogen at 7000 kPa, and heated to 427° C. (800° F.) for 160 minutes at 15100 kPa. The above procedure was repeated for untreated Rawhide coal (100μ particle size).

After cooling, the contents were examined for conversion to hydrocarbon oils. A comparison between treated and untreated Rawhide coal is given in Table 7.

TABLE 7[a]

| | Hydrogen Consumption | Bottoms | Vacuum Gas Oil | Distillate | Naphtha | $C_1$–$C_4$ | $H_2O$ | $H_2S$ |
|---|---|---|---|---|---|---|---|---|
| Untreated Rawhide Coal | −5.8 | 26.8 | 22.1 | 19.6 | 12.1 | 7.3 | 12.5 | 0.6 |
| Treated Rawhide Coal | −6.5 | 20.6 | −7.6 | 32.4 | 21.9 | 12.9 | 17.8 | 3.9 |

Analytical Data

Untreated Rawhide Coal C, 65.28; H, 4.47; N, 0.91; S, 0.55; O, 21.62; ash = 7.17%; H/C ratio = 0.82.
Treated Rawhide Coal C, 63.11; H, 5.38; N, 0.75; S, 4.82; O, 21.17; ash = 4.82%; H/C ratio = 1.02.

(a) Weight percent based on dry ash-free coal.

As can be seen from Table 7 (also FIG. 3), the yields of distillate and naphtha for untreated vs. treated increased by 65% and 81%, respectively. Both of these products are desirable cuts of hydrocarbon oils. These increases occurred partially at the expense of bottoms formation and vacuum gas oil. In fact, there is a net loss of vacuum gas oil in the case of the treated coal.

From the analytical data in Table 7, it is noted that the treated coal has a much higher sulfur content. This is due to ethyl mercaptan incorporation into the coal structure. TI)e sulfur cannot be attributed to the methanesulfonic acid ($CH_3SO_3$-) moiety since there is not a corresponding increase in oxygen analysis. The increased $C_2H_5S$ content of treated coal accounts for the increased $C_1$–$C_4$ and $H_2S$ make for the treated vs. untreated coal.

What is claimed is:

1. A process for the hydroprocessing of coal to produce light hydrocarbon oils which comprises:
    depolymerizing coal by mixing finely divided coal particles with a hard acid in the presence of a soft base at temperatures of from 0° to 100° C., said hard acid being characterized by a heat of reaction with dimethylsulfide of from 10 kcal/mol to 30 kcal/mol and said soft base being characterized by a heat of reaction with boron trifluoride of from 10 kcal/mol to 17 kcal/mol;
    extracting the depolymerized coal with a polar solvent to remove hard acid and soft base;
    forming a mixture of depolymerized coal and catalyst precursor containing a dihydrocarbyl substituted dithiocarbamate of a metal selected from any one of groups IV-B, V-A, VI-A, VII-A and VIII-A or mixtures thereof,
    hydroprocessing the mixture in the presence of a hydrocarbon oil derived from coal processing or an intermediate product stream from petroleum processing at temperatures of from 250° C. to 550° C. and a hydrogen partial pressure of 2100 kPa to 35000 kPa; and
    recovering hydrocarbon oil.

2. The process of claim 1 wherein the hard acid is methanesulfonic acid, toluenesulfonic acid, benzenesulfonic acid, trifluoromethanesulfonic acid, fluoroboric acid, or $H_2O$:$BF_3$ mixtures.

3. The process of claim 1 wherein the soft base is ethylmercaptan, methylmercaptan or dimethylsulfide.

4. The process of claim 1 wherein the finely divided coal has a particle size of from 10 to 1000μ.

5. The process of claim 1 wherein the polar solvent is methanol.

6. The process of claim 1 wherein the temperature is from 15° to 75° C.

7. The process of claim 1 wherein the metal is vanadium, niobium, tantalum, chromium, molybdenum, tungsten, manganese, rhenium, iron, cobalt, nickel, platinum, iridium, palladium, osmium, ruthenium or rhodium.

8. The process of claim 1 wherein the temperature is from 300° to 450° C. and the hydrogen partial pressure is from 3500 to 10000 kPa.

* * * * *